United States Patent [19]

Reaux

[11] Patent Number: 5,456,501
[45] Date of Patent: Oct. 10, 1995

[54] PIPELINE CONNECTION APPARATUS

[75] Inventor: James R. Reaux, Lafayette, La.

[73] Assignee: Oceaneering, Inc., Lafayette, La.

[21] Appl. No.: 112,010

[22] Filed: Aug. 25, 1993

[51] Int. Cl.⁶ .............. F16L 17/00; F16L 55/18; F16L 1/04
[52] U.S. Cl. ............ 285/96; 285/101; 285/323; 405/169; 405/188; 405/190
[58] Field of Search ................ 285/93, 321, 31, 285/104, 105, 96, 101, 322, 323, 18; 405/169, 170, 171, 188, 190, 191, 158

[56] References Cited

U.S. PATENT DOCUMENTS

| | | | |
|---|---|---|---|
| 3,177,019 | 4/1965 | Osweiler | 285/321 X |
| 3,191,972 | 6/1965 | Collar | 285/93 |
| 3,222,088 | 12/1965 | Haeber | 285/93 X |
| 3,711,123 | 1/1973 | Arnold | 285/93 X |
| 4,776,614 | 10/1988 | Marrison et al. | 285/93 X |
| 4,819,968 | 4/1989 | Abe | 385/321 X |
| 5,056,830 | 10/1991 | Reaux | 285/15 |
| 5,209,522 | 5/1993 | Reaux | 285/15 |

Primary Examiner—Dennis L. Taylor
Attorney, Agent, or Firm—Fulbright & Jaworski

[57] ABSTRACT

A pipeline connector apparatus comprising piston actuated means for gripping and sealing a pipe comprising a cylinder having an inner surface, the cylinder having a first groove for receiving a spring biased ring, a piston movable in the cylinder and actuating one of the gripping and sealing means, the piston having a second groove holding a spring biased ring. A plurality of compressible and relaxable spring biased rings are provided, each having an outer surface and a radius such that each will compress within the second groove and will expand within the first groove. The outer surfaces of the different rings have shoulders of different widths which allows the operator to control the piston stroke in the cylinder. The apparatus further comprises a means for predetermining and/or monitoring the displacement of the pistons.

5 Claims, 3 Drawing Sheets

PIPELINE CONNECTION APPARATUS

BACKGROUND OF THE INVENTION

Pipeline repairs are becoming more common as existing pipe networks age. In particular, there is a need in underwater pipeline repairs for a simple, reliable, weld-free mechanical connector that can be employed with minimum human intervention.

To address the foregoing need for devices to affect underwater pipeline repairs, there has been developed several connectors that do not require welds or flange bolting. For examples, U.S. Pat. Nos. 5,056,830 and 5,209,522 disclose a flange coupling that is engaged by slips instead of bolts.

Pending U.S. patent application Ser. No. 08/106,684, filed Aug. 16 1993, entitled Weldless Pipe Repair Apparatus and Method, discloses a weldless pipe repair apparatus comprising a remote-operated underwater pipe connector. The remote-operated connector grips and seals about a stand of underwater pipe by hydraulicly actuating pistons within the connector which, in turn, actuate gripping slips and an expandable seal. The foregoing invention is a substantial improvement over prior devices. However, the displacement of the pistons and particularly hydraulic pistons are difficult to control making the gripping and sealing force unpredictable and unadjustable. Thus, there has arisen a need for controlling and/or indicating the displacement of the pistons.

SUMMARY OF THE INVENTION

It is an object of the present invention to control and/or to monitor the displacement of pistons in a pipeline connection apparatus having pistons.

It is a further object of the present invention to provide a means for indicating the displacement of pistons in a pipeline connection apparatus having pistons.

To achieve the foregoing objects, there is disclosed a pipeline connection apparatus with piston actuated means for gripping and sealing a pipe comprising a cylinder having an inner surface, the cylinder having a first groove for receiving a spring biased ring, a piston movable in the cylinder and actuating one of the gripping and sealing means, the piston having a second groove holding a spring biased ring, the second groove opening adjacent to the inner surface of the cylinder. A plurality of compressible and relaxable spring biased rings are provided, each having an outer surface and a radius such that each will compress within the second groove and will expand within the first groove. The outer surfaces of the different rings have shoulders of different widths. One of the rings is selected to be placed in the second groove depending on the length desired of piston stroke in the cylinder.

Also to achieve the foregoing objects there is disclosed a pipeline connection apparatus further comprising means for indicating that a ring has expanded into the first groove including a movable indicator in communication with the first groove.

Also to achieve the foregoing objects there is disclosed a pipeline apparatus in which the cylinder has a substantially transverse passageway therethrough in communication with the first groove, and the indicator comprises a rod of sufficient length to extend visibly out of the cylinder through the passageway upon expansion of a ring into the first groove.

Also to achieve the foregoing objects there is disclosed a pipeline connection apparatus with means for hydraulicly gripping and sealing together pipes comprising a cylinder having an inner surface, the cylinder defining a first groove for receiving a spring biased ring; a piston movable in the cylinder having a second groove for holding a spring biased ring, the second groove opening adjacent to the inner surface of the cylinder. A spring biased ring positioned within the second groove, the ring having a radius such that the ring lies compressed in the second groove and will expand into the first groove. Means for indicating whether the ring has expanded into the first groove, including a movable indicator in communication with the first groove and actuated by the expansion of the ring.

DETAILED DESCRIPTION OF THE INVENTION AND PREFERRED EMBODIMENT

The present invention is particularly useful in connecting sections of pipe underwater. For purposes of illustration only, the present invention will be described as used in the connector disclosed in pending U.S. patent application Ser. No. 08/106,684 filed Aug. 16, 1993, entitled Weldless Pipe Repair Apparatus and Method. However, it is to be understood that the invention has other applications, including the use of a single connector.

Figure 1A:
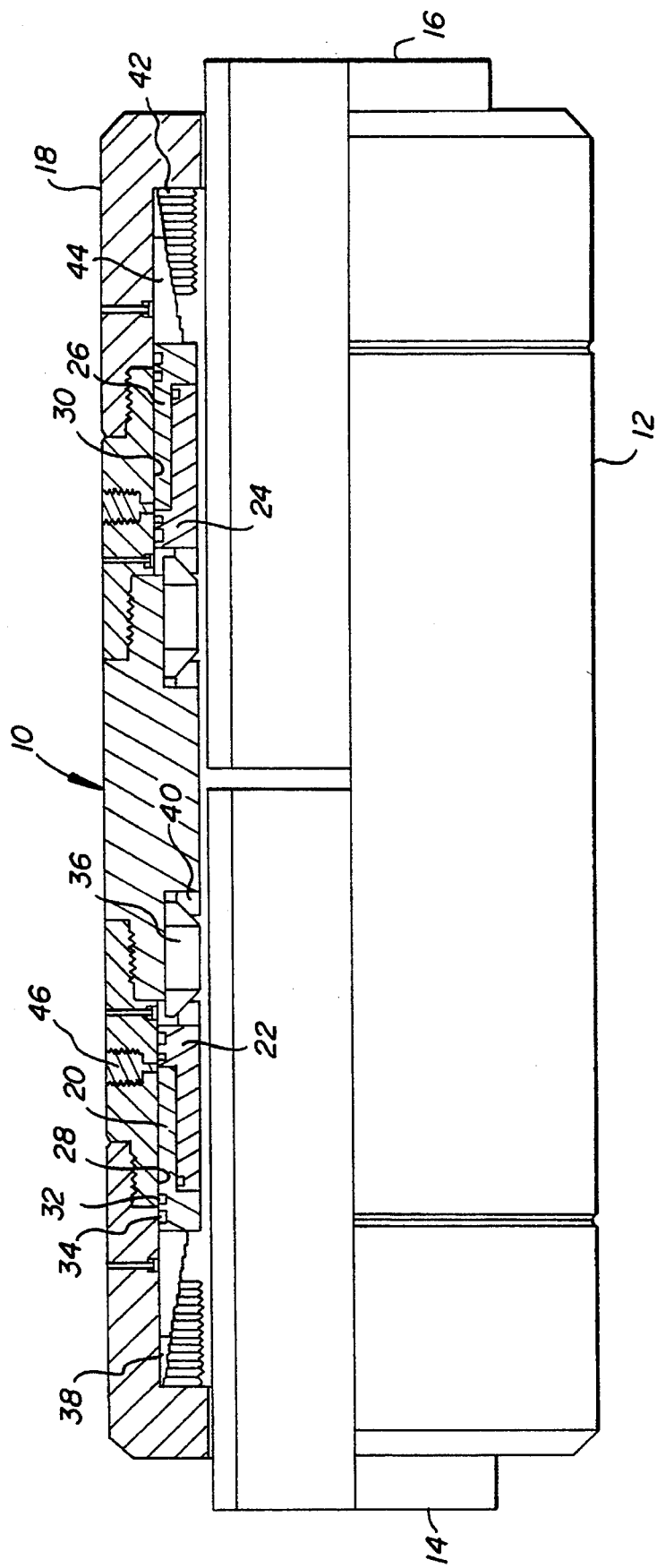
FIG. 1A is an elevational quarter-sectional view of a typical embodiment of the connector of the present invention in which the pistons have not been actuated.

Referring now to the drawings, particularly FIG. 1A, the preferred embodiment of the claimed invention comprises a pipe connector 10 having a body 12 through which two pipes 14 and 16 may be inserted for connection. The body 12 has a cap 18 that houses four pistons 20, 22, 24, and 26, within housings 28 and 30. The pistons have seals 32 and C-rings 34.

The sets of pistons are in communication with seals 36 and slips 38. The seals have extrusion preventors 40. The slips 38 comprise teeth 42 and wedges 44.

Figure 1B:
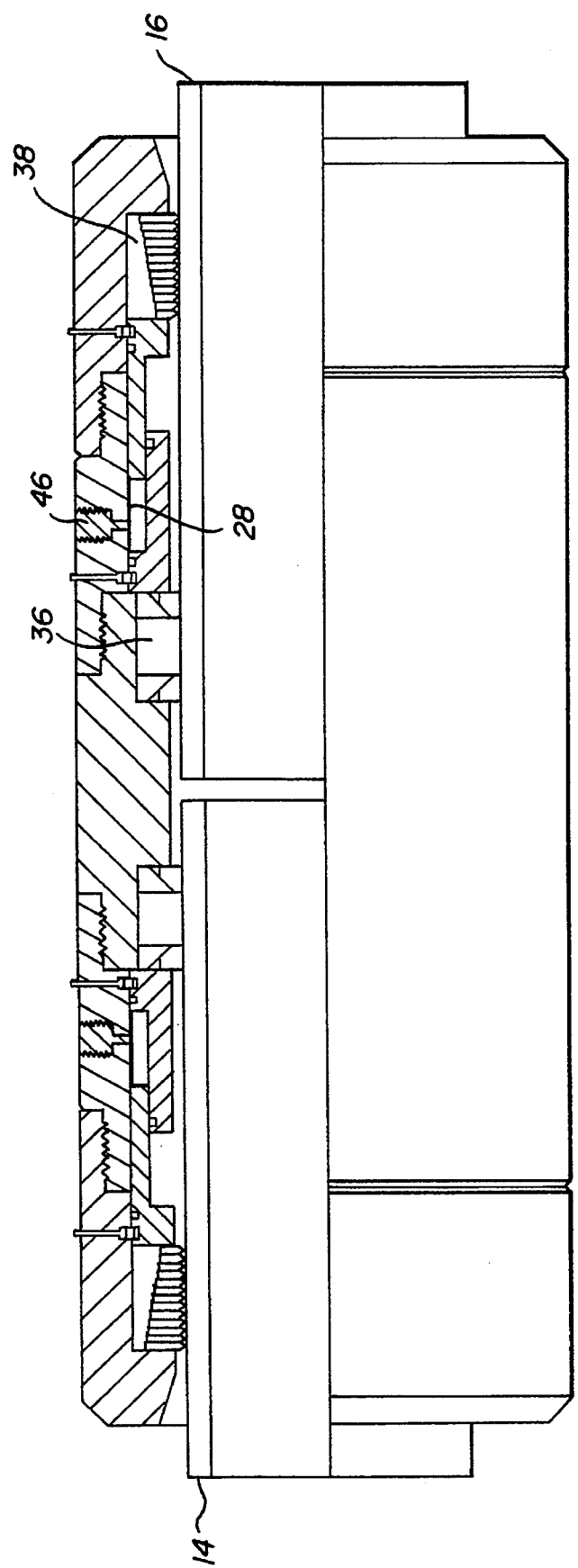
FIG. 1B is an elevational quarter-sectional view of the connector of FIG. 1A in which the pistons have been actuated and the connector is set.

To sealingly connect the two pipes 14 and 16 in accordance with the present invention, hydraulic fluid is injected through passageways 46 into housings 28 and 30, whereby the pistons are driven apart and against the seals 36 and slips 38, as shown in FIG. 1B, whereby the seals 36 and slips 38 are driven into pipes 14 and 16. The pipes 14 and 16 are thereby gripped together by slips 38 and sealed together by seals 36.

Figure 2A:
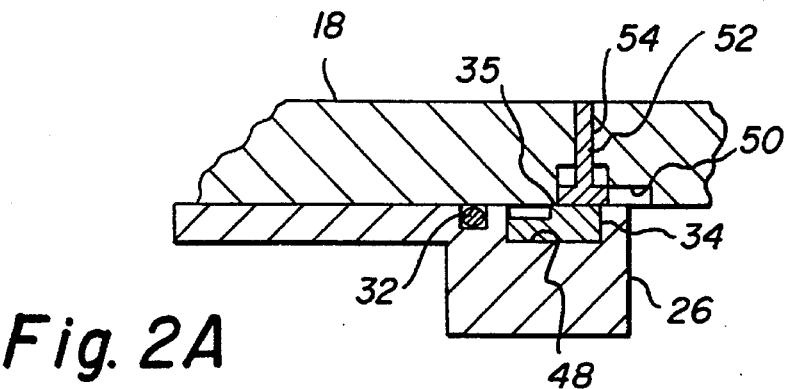
FIG. 2A is a fragmentary elevational cross-sectional view of the unset piston, ring, and indicator of the claimed invention.
Figure 2B:
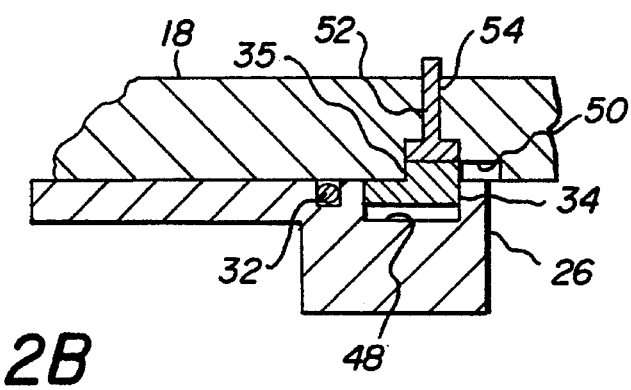
FIG. 2B is a view similar to FIG. 2A but showing the parts in the set positions.

The problem solved by the present invention is to control and/or to monitor the movement of the pistons and, therefore, the dispacement of and the pressure exerted by the seals 36 and the slips 38. The solution to the foregoing problem is best illustrated in FIGS. 2A and 2B, which depict a cross-sectional view of the piston 26, which illustrates completely the structure of each of the pistons 20, 22, 24 in FIG. 1A. Piston 26 has a first groove 48 sized for receiving a compressible and relaxable spring biased ring such as C-ring 34. The cap 18 has a second groove 50 sized for receiving the C-ring 34. The C-ring 34 will expand into the second groove 50 once the piston 26 has been sufficiently moved in the cylinder. The C-ring 34 thereby locks the piston 26 in place. The C-ring 34 has a shoulder 35 on its outer periphery which determines when the ring 34 will expand and lock in the first groove 50 and thus is a measurement of a predetermined length of stroke of the piston 26.

An indicator 52 is placed in communication with the second groove 50. The indicator 52 is driven through a passageway 54 through the cap 18 by expansion of the C-ring 34 into the second groove 50. When the indicator 52 is so driven, it is visible above the cap 18 and advises the remote operator of the connector 10 that the ring 34 has locked into place. FIG. 2A depicts the piston 26 in a position prior to expansion of the C-ring 34 into the second groove 50. FIG. 2B depicts the piston 26 after the C-ring 34 into the second groove 50.

In a connector such as depicted in FIG. 1A, it is very desirable to be able to control precisely the expansion of the pistons and, thereby, the distance and force of extension of the seals and the slips. Such control enables the connector operator to adjust the grips and slips for different pipe diameters and different water pressures. Accordingly, the present invention provides for a plurality of C-rings as depicted in FIGS. 3A, 3B, and 3C.

Figure 3A:
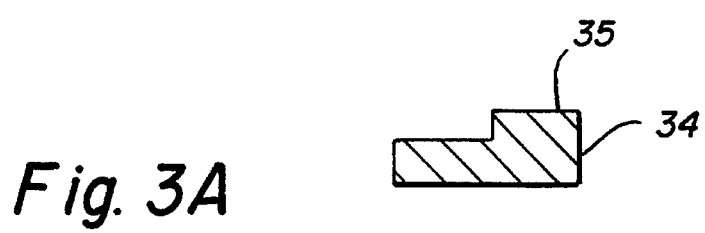
FIGS. 3A, 3B, and 3C are cross-sectional views of typical embodiments of the rings used in the claimed invention.
Figure 3B:
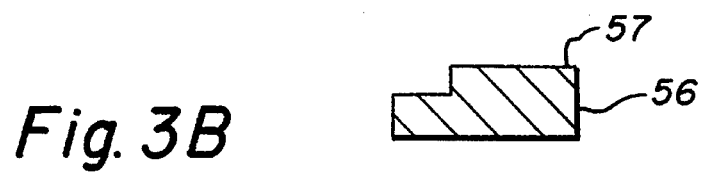
Figure 3C:

As best illustrated in FIGS. 3A, 3B, and 3C, the width of the shoulder of C-ring 34 determines the exact point of expansion of the C-ring 34 into the second groove 50, and, thereby the pressure and extension of the seals and slips. FIG. 3A depicts a ring 34 having a shoulder 35. FIG. 3B depicts a ring 56 having a shoulder 57. FIG. 3C depicts a ring 58 having no shoulder.

A plurality of rings such as those depicted in FIGS. 3A, 3B, and 3C, each ring of the plurality having a shoulder of different magnitude, enables the operator of the connector to predetermine the distance and force of extension of the seals and slips simply by selecting from the plurality of C-rings the C-ring that has the desired shoulder, if any.

I claim:

1. A pipeline connection apparatus with piston actuated means for gripping and sealing a pipe comprising:

a cylinder having an inner surface, the cylinder having a first groove, located on the inner surface of the cylinder, for receiving a spring biased ring;

a piston movable in the cylinder and actuating one of a gripping and sealing means, the piston having a second groove, located on the outer surface of the piston, holding a spring biased ring, the second groove opening adjacent to the inner surface of the cylinder; and a plurality of compressible, relaxable, and substitutable spring biased rings, each ring having an outer surface and having a radius such that each will compress within the second groove and will expand within the first groove, the outer surfaces of each ring having shoulders of different widths, whereby each shoulder width determines a length of a stroke of the cylinder within the piston when placed within the first and second grooves.

2. The apparatus of claim 1 further comprising means, located in and extending through the cylinder, for indicating that one of the rings has expanded into the first groove including a movable indicator in communication with the first groove.

3. The apparatus of claim 2 in which the cylinder has a substantially transverse passageway therethrough in communication with the first groove, and the indicator comprises a rod of sufficient length to extend visibly out of the cylinder through the passageway upon expansion of one of the rings into the first groove.

4. A pipeline connection apparatus with piston actuated means for gripping and sealing a pipe comprising:

a cylinder having an inner surface, the cylinder having a first groove, located on the inner surface of the cylinder, for receiving a spring biased ring;

a piston movable in the cylinder and actuating one of a gripping and sealing means, the piston having a second groove, located on the outer surface of the piston, holding a spring biased ring, the second groove opening adjacent to the inner surface of the cylinder;

a spring biased ring positioned within the second groove, the ring having a radius such that the ring lies compressed in the second groove and will expand into the first groove on a predetermined movement of the piston; and means for indicating whether the ring has expanded into the first groove, including a movable indicator in communication with the first groove and extendable out of the cylinder.

5. The apparatus of claim 4 in which the cylinder has a substantial transverse passageway therethrough in communication with the first groove, and the indicator comprises a rod of sufficient length to extend visibly through the passageway upon expansion of the ring into the first groove.

\* \* \* \* \*